US012801291B2

(12) United States Patent
Lee

(10) Patent No.: US 12,801,291 B2
(45) **Date of Patent: *Nov. 17, 2026**

(54) NON-VOLATILE MEMORY STORAGE FOR MULTI-CHANNEL MEMORY SYSTEM

(71) Applicant: Netlist, Inc., Irvine, CA (US)

(72) Inventor: Hyun Lee, Ladera Ranch, CA (US)

(73) Assignee: Netlist, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/899,679

(22) Filed: Sep. 27, 2024

(65) Prior Publication Data

US 2025/0094061 A1 Mar. 20, 2025

Related U.S. Application Data

(63) Continuation of application No. 18/353,597, filed on Jul. 17, 2023, now abandoned, which is a (Continued)

(51) Int. Cl.
*G06F 3/06* (2006.01)
*G06F 12/02* (2006.01)
(Continued)

(52) U.S. Cl.
CPC ............ *G06F 3/0619* (2013.01); *G06F 3/065* (2013.01); *G06F 3/0653* (2013.01); (Continued)

(58) Field of Classification Search
CPC ...... G06F 3/0619; G06F 3/065; G06F 3/0653; G06F 3/0685; G06F 12/0246; (Continued)

(56) References Cited

U.S. PATENT DOCUMENTS 5,355,467 A * 10/1994 MacWilliams ..... G06F 12/0811 711/146
9,436,600 B2 * 9/2016 Lee ..................... G06F 3/0685
(Continued)

*Primary Examiner* — Hiep T Nguyen
(74) *Attorney, Agent, or Firm* — Vorys, Sater, Seymour and Pease LLP; Khaled Shami

(57) ABSTRACT

A memory system that has a multi-channel volatile memory subsystem is coupled to a non-volatile memory subsystem to provide independent, configurable backup of data. The volatile memory subsystem has one or more main memory modules that use a form of volatile memory such as DRAM memory, for which the NV subsystem provides selective persistent backup. The main memory modules are dual in-line memory modules or DIMMs using DDR SDRAM memory devices. The non-volatile memory subsystem (NV backup) includes an NV controller and non-volatile memory NVM. The NV backup can also include a memory cache to aid with handling and storage of data. In certain embodiments, the NV controller and the nonvolatile memory are coupled to the one or more DIMM channels of the main memory via associated signal lines. Such signal lines can be, for example, traces on a motherboard, and may include one or more signal buses for conveying data, address, and/or control signals. The NV controller and the non-volatile memory can be mounted on the motherboard.

23 Claims, 5 Drawing Sheets

Related U.S. Application Data continuation of application No. 17/660,446, filed on Apr. 25, 2022, now abandoned, which is a continuation of application No. 16/932,611, filed on Jul. 17, 2020, now Pat. No. 11,314,422, which is a continuation of application No. 15/976,321, filed on May 10, 2018, now Pat. No. 10,719,246, which is a continuation of application No. 15/255,894, filed on Sep. 2, 2016, now Pat. No. 9,996,284, which is a continuation of application No. 14/302,292, filed on Jun. 11, 2014, now Pat. No. 9,436,600.

(60) Provisional application No. 61/833,848, filed on Jun. 11, 2013.

(51) Int. Cl.
*G06F 12/0815* (2016.01)
*G06F 12/0868* (2016.01)

(52) U.S. Cl.
CPC ........ *G06F 3/0685* (2013.01); *G06F 12/0246* (2013.01); *G06F 12/0815* (2013.01); *G06F 12/0868* (2013.01); *G06F 2212/214* (2013.01); *G06F 2212/621* (2013.01)

(58) Field of Classification Search
CPC ............. G06F 12/0815; G06F 12/0868; G06F 2212/214; G06F 2212/621
See application file for complete search history.

(56) References Cited

U.S. PATENT DOCUMENTS

| | | | | |
|---|---|---|---|---|
| 9,996,284 | B2 * | 6/2018 | Lee | G06F 12/0868 |
| 10,719,246 | B2 * | 7/2020 | Lee | G06F 12/0815 |
| 2009/0144505 | A1 * | 6/2009 | Auemhammer | G06F 12/0893 711/E12.001 |

* cited by examiner

NON-VOLATILE MEMORY STORAGE FOR MULTI-CHANNEL MEMORY SYSTEM

PRIORITY CLAIM

This application is a continuation of U.S. patent application Ser. No. 18/353,597 filed Jul. 17, 2023, which is a continuation of U.S. patent application Ser. No. 17/660,446 filed Apr. 25, 2022, which is a continuation of U.S. patent application Ser. No. 16/932,611 filed Jul. 17, 2020, now U.S. Pat. No. 11,314,422, which is a continuation of U.S. patent application Ser. No. 15/976,321 filed May 10, 2018, now U.S. Pat. No. 10,719,246, which claims the benefit of U.S. patent application Ser. No. 15/255,894 filed Sep. 2, 2016, now U.S. Pat. No. 9,996,284, which claims the benefit of U.S. patent application Ser. No. 14/302,292 filed Jun. 11, 2014, now U.S. Pat. No. 9,436,600, which claims the benefit of U.S. Prov. App. No. 61/833,848 filed Jun. 11, 2013, the contents of all of which are incorporated herein by reference in their entirety.

TECHNICAL FIELD

The present disclosure relates generally to computer memory devices, and more particularly, to devices that employ different types of memory devices such as combinations of volatile and non-volatile memories.

BACKGROUND

Memory devices used for computer data storage can be classified into two categories: volatile memory and non-volatile memory. For volatile memory, such as DRAM, maintaining device states and preserving stored information requires a constant supply of power. Any interruption of power will result in loss of stored information. Preventing such loss requires the use of back up batteries or other energy storage devices, which may be expensive, bulky and difficult to maintain.

Non-volatile memory, by comparison, does not need power to maintain its information content. However, non-volatile memory may not be as economical or efficient or fast as volatile memory, and has accordingly not replaced volatile memory as a viable data storage alternative. Nevertheless, in certain circumstances, it can be useful to back up volatile memory with non-volatile memory, for example to avoid catastrophic data loss in the event of power outage. Data thus backed up in non-volatile memory is preserved despite power disruptions, and can be copied back into the volatile memory when normal operation resumes.

It may be inefficient or impractical to back up all volatile memory data all the time using non-volatile memory. More practical approaches rely on selective storage, for example of critical data only; or on detecting a potential power loss in advance and then backing up any critical data, or data that is intermediate to a currently-executing process, while some power still remains, or while a small, economical amount of power can be provided.

There are many types of non-volatile memory. One common type is termed "flash" memory, and relies on charge storage in gates of floating-gate transistors. The charge storage is persistent and interruptions in power have no short term impact on the information content, endowing the memory with its non-volatile character. Individual flash memory cells, comprised of one or more floating-gate transistors, can be configured to store a single binary value (single-level cells, or SLCs), or multiple binary values (multi-level cells, or MLCs). The flash memory chip can comprise millions, or billions, of such cells, and is currently available in numerous formats, such as 2 gigabit (Gb), 4 Gb, 8 Gb, and so on. The chips themselves can be combined in various architectures in a memory module, to be accessed by way of a flash memory controller that selectively issues memory accesses commands using control and address signals to the flash memory chips for retrieval or storage of data based on the needs of the host device.

Overview

A memory system that has a volatile memory subsystem is coupled to a non-volatile memory subsystem (or "non-volatile memory subsystem" or "NV backup" or "NV backup subsystem") to provide independent, configurable backup or storage of data. In certain embodiments, the volatile memory subsystem has one or more main memory modules that may be in the form of volatile memory such as DRAM memory, for which the NV backup subsystem provides selective persistent backup. In one embodiment, the main memory modules are dual in-line memory modules or DIMMs using DDR SDRAM memory devices. The NV backup subsystem includes an NV controller and non-volatile memory NVM (e.g., FLASH). In certain embodiments, the NV backup also includes a memory cache, such a DRAM, to aid with handling and storage of data. In certain embodiments, the NV controller and the non-volatile memory are not mounted on any of the one or more DIMM physical slots or locations, but are instead coupled to the one or more DIMM channels of the main memory via associated signal lines. Such signal lines can be, for example, traces on a motherboard, and may include one or more signal buses for conveying data, address, and/or control signals. The NV controller and the non-volatile memory can be mounted on the motherboard.

Described herein is a method for performing memory access operations in a computer system having a memory controller includes coupling the memory controller to a first memory channel via a first set of data, address and control signal lines, coupling the memory controller to a second memory channel via a second set of data, address and control signal lines, wherein the computer system is operable to have independent access to the first memory channel and the second memory channel via the memory controller, coupling a nonvolatile memory subsystem to the first memory channel and to the second memory channel, the nonvolatile memory subsystem including an NV (non-volatile) controller and at least one nonvolatile memory element, using the NV controller to monitor each of the first and second memory channels to detect one or more memory access operations to at least one predetermined address range, and capturing a copy of data associated with the one or more memory access operations.

Also described herein is a method for performing memory access operations in a computer system having first and second volatile memory modules, the computer system including a memory controller configured to independently access the first and second volatile memory modules via respective first and second memory channels, the first volatile memory module being coupled to the first memory channel via a first set of data, address and control signal lines, the second volatile memory module being coupled to the second memory channel via a second set of data, address and control signal lines. The method includes monitoring, using at least one NV (non-volatile) controller, the first and second memory channels to detect memory access operations, capturing a copy of data associated with a first memory access operation to a first address range using a first one of the at least one NV controller upon detection of the first memory access operation, wherein the first memory access operation allows data to be communicated between the memory controller and the first volatile memory module using the first memory channel, and capturing a copy of data associated with a second memory access operation to a second address range using a second one of the at least one NV controller upon detection of the second memory access operation, wherein the second memory access operation allows data to be communicated between the memory controller and the second volatile memory module using the second memory channel.

Also described herein is a method for operating a non-volatile memory subsystem having an NV (non-volatile) controller and one or more nonvolatile memory modules, The method includes using at least two memory channels to couple a host computer system to a volatile memory subsystem, wherein the at least two memory channels are independently accessible by the host computer system, coupling the NV controller to the one or more nonvolatile memory modules, coupling the NV controller to the at least two memory channels, wherein each one of the at least two memory channels includes address, data and control signals, monitoring each one of the at least two memory channels for the occurrence of one or more memory access operations to the volatile memory subsystem, and capturing a copy of data associated with a first memory access operation of the one or more memory access operations.

BRIEF DESCRIPTION OF THE DRAWINGS

The accompanying drawings, which are incorporated into and constitute a part of this specification, illustrate one or more examples of embodiments and, together with the description of example embodiments, serve to explain the principles, and implementations of the embodiments.

In the drawings.

DESCRIPTION OF EXAMPLE EMBODIMENTS

Example embodiments are described herein in the context of non-volatile memory storage for a multichannel memory system. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application—and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1:
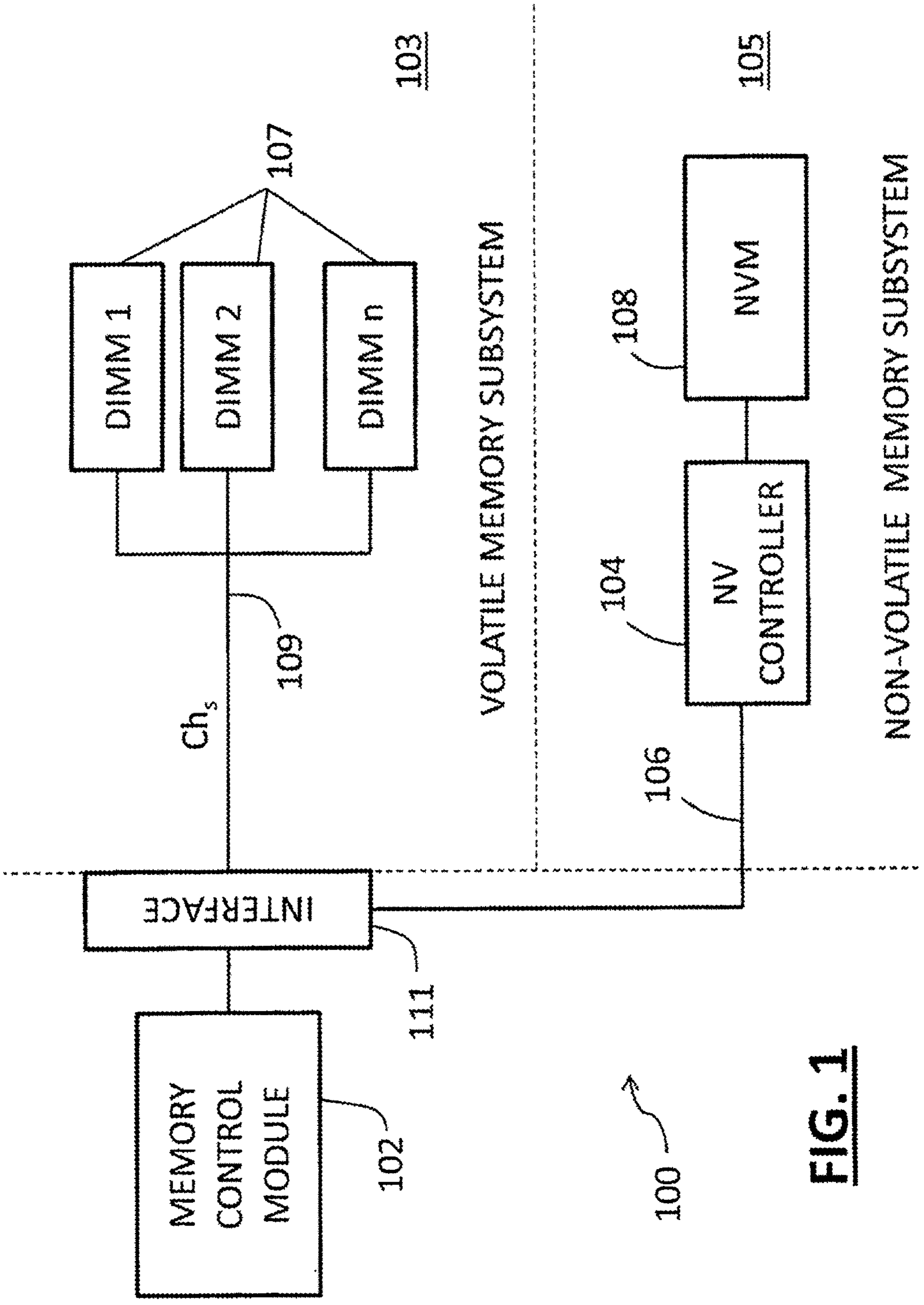
FIG. 1 is a block diagram of a memory system in which a memory control module is coupled to a single-channel volatile memory subsystem.

FIG. 1 illustrates a memory system 100 in which a memory control module 102 is coupled to a single-channel volatile memory subsystem 103 via a single memory channel $Ch_S$ 109. The coupling is effected by way of a main interface 111 for delivery of the data, address and/or control signals. In certain embodiments, the interface 111 can be one or more of an electrical connector, printed circuit board with a plurality of conduits or copper traces, controller, microprocessor, logic device, integrated circuit, programmable logic device, register, switch, or load reducing circuit, or combinations thereof. The volatile memory subsystem 103 can have one or more volatile memory modules 107, for example DIMMs (dual in-line memory modules), connected on the single channel $Ch_S$ 109 for communication of data, address and control signals between memory control module 102 and the one or more memory modules 107. Memory control module 102 may be a CPU, a processor, a memory control system, or a memory controller and may be part of a host computer system (not shown). The interface 111 can be integrated within the memory control module 102. For example, the interface 111 can be a portion of a memory controller or a CPU of a computer system.

Memory system 100 also includes a NV memory subsystem 105 according to one embodiment. As shown in FIG. 1, the NV subsystem 105 has at least one NV controller 104, non-volatile memory NVM (e.g., a FLASH memory device or a memory module including flash memory devices) 108, and a common signal bus 106 that is coupled to the interface 111. In one embodiment, the common signal bus 106 is external to the NV memory subsystem 105 and is used to couple the NV memory subsystem 105 to the memory control module 102 or to the one or more memory modules 107. In one embodiment, the NV controller 104 communicates data, address, and/or control signals via the interface 111 between the NVM 108 and any memory module of the one or more memory modules 107, and the memory control module 102. In one embodiment, the one or more memory modules 107 populate one or more DIMM sockets on a motherboard (not shown), and the common signal bus 106 comprises board traces in one or more conductive layers of a motherboard (not shown). In certain embodiments, the NVM 108 comprises one or more of a non-volatile memory array, at least one non-volatile memory element or die, at least one packaged non-volatile memory device, at least one module comprising non-volatile memory, or combinations thereof. Types of non-volatile memory compatible with NVM 108 include, but are not limited to, flash memory elements such as multi-level cell (MLC), NOR, ONE-NAND, and NAND flash memory.

Figure 2:
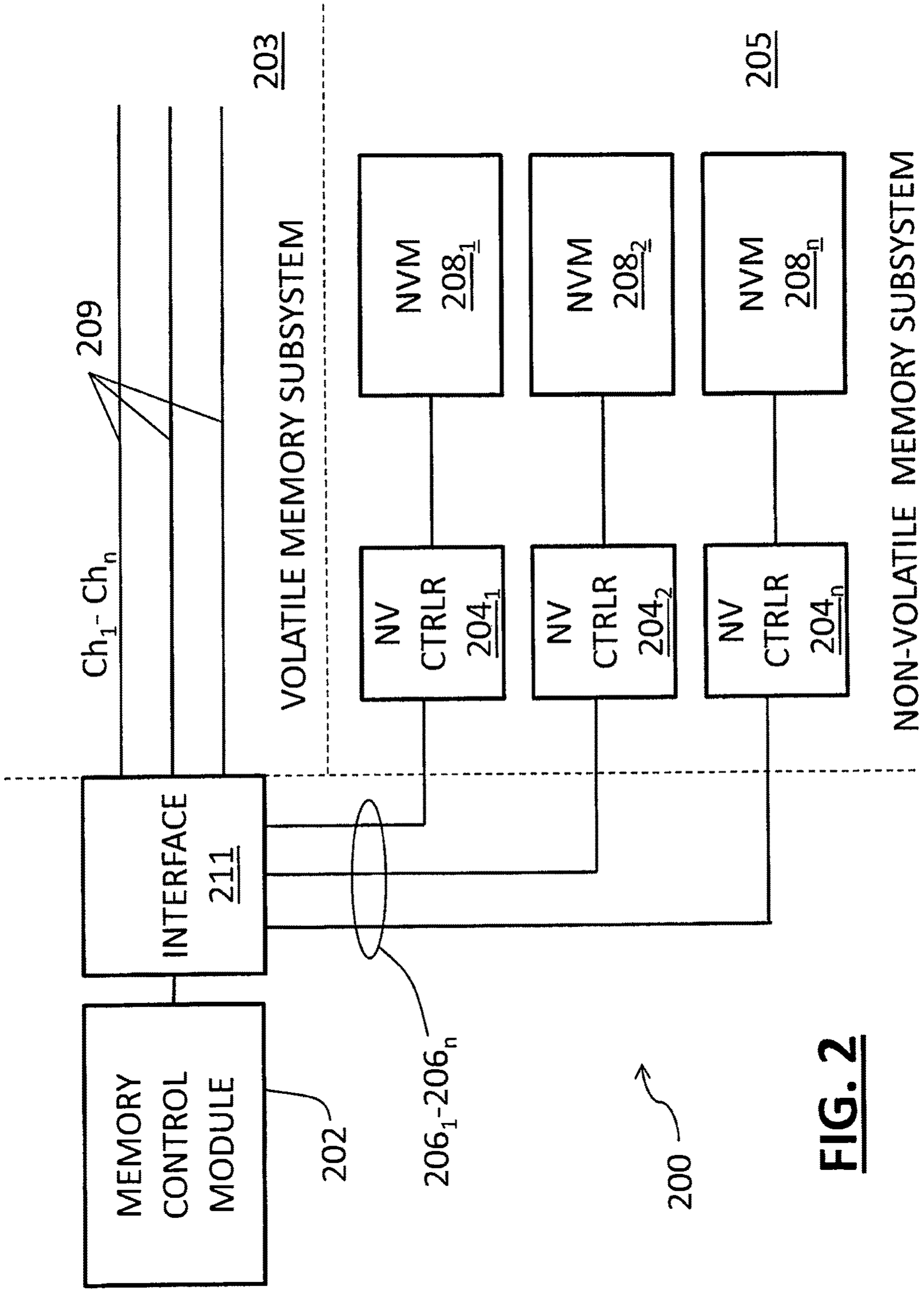
FIG. 2 is a block diagram of a memory system in which a memory control module is coupled to a volatile memory subsystem in a multi-channel arrangement and in which an NV memory subsystem includes a plurality of NV controllers each coupled to a respective memory module channel using a separate respective signal bus.

FIG. 2 illustrates a memory system 200 in which a memory control module 202 is coupled to a volatile memory subsystem 203 in a multi-channel arrangement $Ch_1$-$Ch_n$ 209. Each of the channels $Ch_1$-$Ch_n$ 209 can be coupled to one or more volatile memory modules, for example DIMMs, connected in the manner of FIG. 1 above and not shown in FIG. 2 for clarity. Each of the channels $Ch_1$-$Ch_n$ 209 is independently and individually-addressable by the memory control module 202, and is used to communicate data, address and control signals between the memory control module 202 and the one or more memory modules (DIMMs) of the volatile memory subsystem 203.

Also shown coupled to the memory control module 202 is NV memory subsystem 205 according to one embodiment. NV memory subsystem 205 includes a plurality of NV controllers $204_1$ through 204, each coupled to a respective memory module channel $Ch_1$-$Ch_n$ 209 via an interface 211 using a separate respective signal bus $206_1$ through $206_n$. The NV backup subsystem 205 also includes nonvolatile memory NVM $208_1$ through $208_n$, each coupled to a respective NV controller $204_1$ through $204_n$. In one embodiment, each separate signal bus $206_1$-$206_n$ is external to the NV memory subsystem 205 and is used to communicate data, address, and/or control signals between the NV controller 204 and a respective memory module coupled to any memory module channel of the memory module channel $Ch_1$-$Ch_n$ 209. In one embodiment, the coupling between the memory control module 202, the volatile memory subsystem 203, and the NV memory subsystem 205 is effected by way of the interface 211 for delivery of data, address and/or control signals via a respective memory channel of the memory module channel $Ch_1$-$Ch_n$ 209 and a respective one or more signal bus of the signal bus $206_1$-$206_n$.

In certain embodiments, each of NVM $208_1$ through $208_n$ comprises one or more of a non-volatile memory array, at least one non-volatile memory element or die, at least one packaged non-volatile memory device, at least one module comprising non-volatile memory, a FLASH memory device, or a memory module including one or more flash memory devices, or a combination thereof. Types of non-volatile memory compatible with each of NVM $208_1$ through $208_n$ include, but are not limited to, flash memory elements such as multi-level cell (MLC), NOR, ONE-NAND, and NAND flash memory.

In certain embodiments, the interface 211 can be one or more of an electrical connector, a printed circuit board with a plurality of conduits or copper traces, controller, microprocessor, logic device, integrated circuit, programmable logic device, register, switch, and load reducing circuit. In one embodiment, each separate signal bus $206_1$-$206_n$ comprises board traces in one or more conductive layers of a motherboard (not shown). In certain embodiments, memory control module 202 comprises a CPU, a processor, a memory control subsystem, or a memory controller. In certain embodiments, memory control module 202 may be part of a host computer system (not shown). In certain embodiments, the interface 211 can be integrated with the memory control module 202, a CPU, or a memory controller to form a single component, an integrated circuit, or a memory system for example the interface 211 can be a portion of a memory controller or a CPU of a computer system.

In certain embodiments, the interface 211 includes logic (i) to generate, process, or format one or more of data signals, address signals and control signals, and (ii) to selectively transmit data signals, address signals and/or control signals between two or more of the memory control module 202, the volatile memory subsystem 203, and the NV memory subsystem 205 using one or more channels of the memory module channels $Ch_1$-$Ch_n$ 209 and a respective one or more signal bus of the signal bus $206_1$-$206_n$. In certain embodiments, the interface 211 is integrated with the memory control module 202, a CPU, or a memory controller to form a single component, an integrated circuit, or a memory system.

In certain embodiments, the interface 211 snoops a first set of data, address, and control signals from one or more of channels $Ch_1$-$Ch_n$ 209, and transmits a second set of data, address, and control signals via one or more of the signal buses $206_1$-$206_n$. The second set of data, address, and control signals is generated based on the first set of data, address, and control signals. In one embodiment, the second set of data, address, and control signals is a copy of the first set of data, address, and control signals. In one embodiment, one or more of data signals, address signals, and control signals of the first set of data, address, and control signals are processed by interface 211 before being transmitted as part of the second set of data, address, and control signals. For example, the interface 211 can include a serializer/deserializer (or SERDES) (not shown) in order to receive, process, format, and transmit data signals, address signals, or control signals using a serial interface or a parallel interface. In certain embodiments, the memory module channels $Ch_1$-$Ch_n$ 209 include a parallel interface, while the signal bus $206_1$-$206_n$ include one or more of a serial interface and a parallel interface. In certain embodiments, the interface 211 is operable to process, replicate, regenerate, modify, delay, format, compress, error check, or generate one or more of data signals, address signals, and control signals of the second set of data, address, and control signals based on one or more of data signals, address signals, and control signals of the first set of data, address, and control signals. In certain embodiments, the interface 211 is coupled to the NV controller 204 via a single common signal bus instead of the separated signal bus $206_1$-$206_n$, wherein the interface 211 manages and controls communication of data, address, and/or control signals from/to the NV memory subsystem 205 to/from at least one of the memory control module 202 and one or more memory modules that are coupled to one or more of channels $Ch_1$-$Ch_n$ 209.

Figure 3:
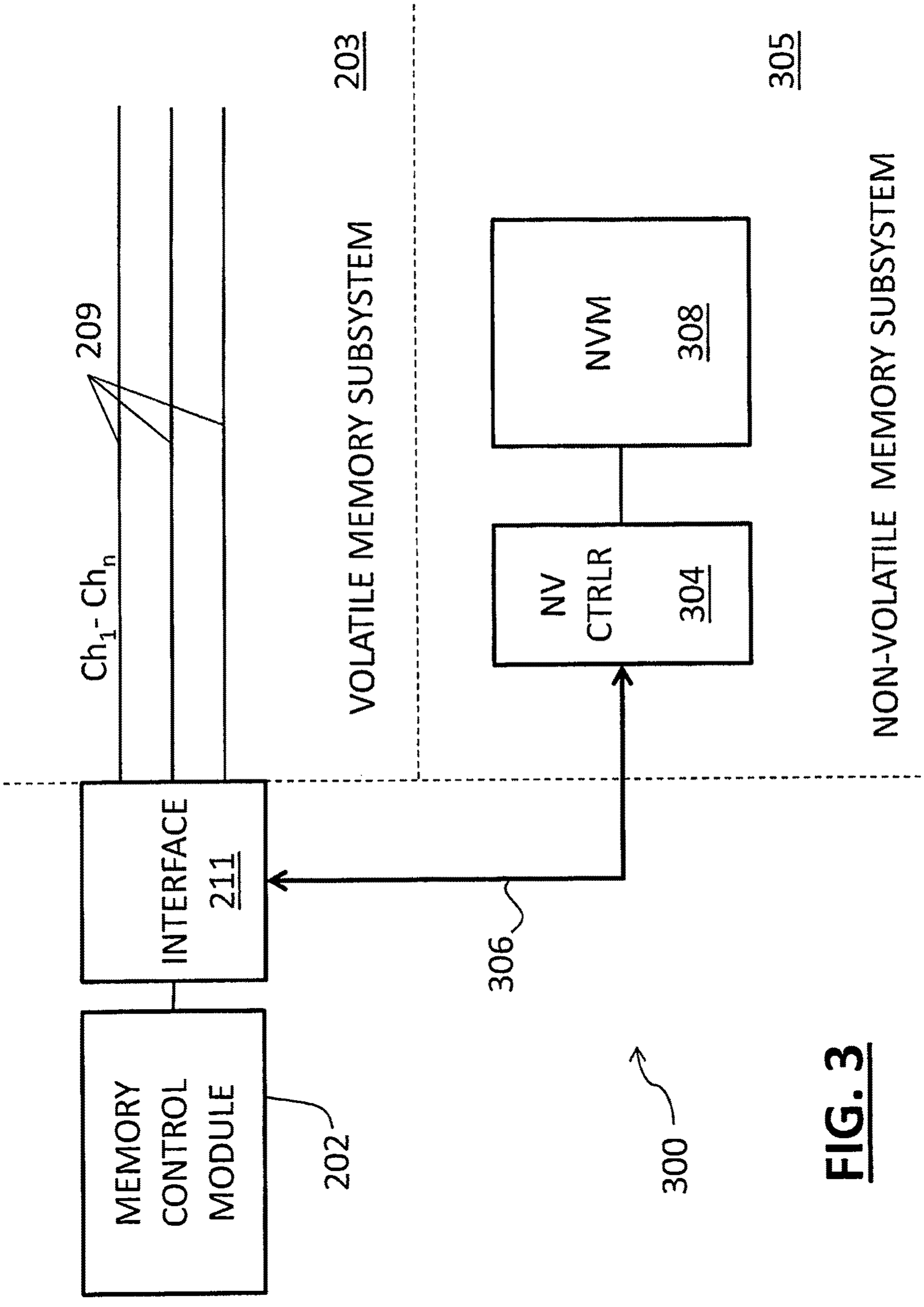
FIG. 3 is a block diagram of a memory system in which a memory control module is coupled to a volatile memory subsystem in a multi-channel arrangement, and in which an NV memory subsystem includes an NV controller coupled to one or more channels of the memory module channels using a common signal bus.

FIG. 3 illustrates a memory system 300 in which the memory control module 202 is coupled to the volatile memory subsystem 203 in the multi-channel arrangement $Ch_1$-$Ch_n$ 209 via the interface 211 as shown in FIG. 2 and as described above. Also shown coupled to the memory control module 202 is NV memory subsystem 305 according to one embodiment. The NV memory subsystem 305 includes NV controller 304 coupled to one or more channels of the memory module channels $Ch_1$-$Ch_n$ 209 via the interface 211 using a common signal bus 306. The NV memory subsystem 305 also includes nonvolatile memory NVM 308 which is coupled to the NV controller 304. In certain embodiments, the NV controller 304 comprises a plurality of NV controllers each of which may be used to independently control data communication between the NVM 308 and at least one of the memory control module 202 and the volatile memory subsystem 203.

In certain embodiments, the NVM 308 comprises one or more of a non-volatile memory array, at least one non-volatile memory element or die, at least one packaged non-volatile memory device, at least one module comprising non-volatile memory, a FLASH memory device, or a memory module including one or more flash memory devices, or combinations thereof. Types of non-volatile memory compatible with NVM 308 include, but are not limited to, flash memory elements such as multi-level cell (MLC), NOR, ONE-NAND, and NAND flash memory.

In one embodiment, the common signal bus 306 is external to the NV memory subsystem 305 and is used to communicate data, address, and/or control signals between the NV controller 304 and a memory module coupled to any memory module channel of the memory module channel $Ch_1$-$Ch_n$ 209. In one embodiment, the coupling between the memory control module 202, the volatile memory subsystem 203, and the NV memory subsystem 305 is effected by way of the interface 211 for delivery of data, address and/or control signals via a respective memory channel of the memory module channel $Ch_1$-$Ch_n$ 209, or via the common signal bus 306.

In one embodiment, the common signal bus 306 comprises separate signal bus $306_1$-$306_n$ (not shown) and each such signal bus of the signal bus $306_1$-$306_n$ is operable to deliver data, address, and control signals between a respective channel of the memory module channel $Ch_1$-$Ch_n$ 209 and the NV controller 304, in a similar manner as shown in FIG. 2 and as described above. The NV controller 304 is operable to receive and separately control each signal bus of the signal bus $306_1$-$306_n$. The NV controller 304 in turn controls the transfer or storage of data from/to the NVM 308. In one embodiment, each of the signal buses $306_1$-$306_n$ is individually-addressable by the memory control module 202 or the NV controller 304, and is independently used to communicate data, address and control signals between the NV controller 304 and at least one of the memory control module 202 and one or more memory modules (DIMMs) (not shown) of the volatile memory subsystem 203.

In certain embodiments, the interface 211 is operable (i) to communicate one or more of data signals, address signals and control signals with the memory control module 202, (ii) to generate, process, or format one or more of data signals, address signals and control signals based at least in part on received data signals, address signals or control signals from the memory control module 202, the volatile memory subsystem 203, or the NV subsystem 305, and (iii) to selectively transmit one or more of data signals, address signals, and control signals to one or more of the memory control module 202, the volatile memory subsystem 203, and the NV subsystem 305 using at least one of a channel of the memory module channel $Ch_1$-$Ch_n$ 209, the common signal bus 306, and a signal bus of the signal bus $306_1$-$306_n$. In certain embodiments, the interface 211 is integrated with the memory control module 202, a CPU, or a memory controller to form a single component, an integrated circuit, or a memory system.

In certain embodiments, the interface 211 snoops at least one of data signals, address signals, and control signals from one or more channel of the memory module channel $Ch_1$-$Ch_n$ 209, and transmits the at least one of data signals, address signals, and control signals to the NV controller 304 via the common signal bus 306. In certain embodiments, the interface 211 generates at least one of data signals, address signals, and control signals in response to at least one of data signals, address signals, and control signals received from any one of the memory control module 202, the volatile memory subsystem 203, or the NV subsystem 305. The interface 211 transmits the generated at least one of data signals, address signals, and control signals to the NV controller 304 via the common signal bus 306.

In certain embodiments, the interface 211 snoops a first set of data, address, and control signals from one or more channel of the memory module channel $Ch_1$-$Ch_n$ 209, and transmits a second set of data, address, and control signals via the common signal bus 306. The second set of data, address, and control signals is generated based on the first set of data, address, and control signals. In one embodiment, the second set of data, address, and control signals correspond to a copy of the first set of data, address, and control signals. In one embodiment, one or more of data signals, address signals, and control signals of the first set of data, address, and control signals are processed by interface 211 before being transmitted as part of the second set of data, address, and control signals. For example, the interface 211 includes a serializer and a deserializer (or SERDES) in order to receive, process, format, and transmit data signals, address signals, or control signals using a serial interface or a parallel interface. In certain embodiments, the memory module channel $Ch_1$-$Ch_n$ 209 include a parallel interface, while the common signal bus 306 includes at least one serial interface or at least one parallel interface. In certain embodiments, the interface 211 is operable to process, replicate, regenerate, modify, delay, format, compress, error check, or generate one or more of data signals, address signals, and control signals of the second set of data, address, and control signals based on one or more of data signals, address signals, and control signals of the first set of data, address, and control signals. In certain embodiments, the interface 211 manages and controls communication of data, address, and/or control signals from/to the NV memory subsystem 305 to/from at least one of the memory control module 202 and one or more memory modules that are coupled to one or more channels of the memory module channel $Ch_1$-$Ch_n$ 209.

Figure 4:
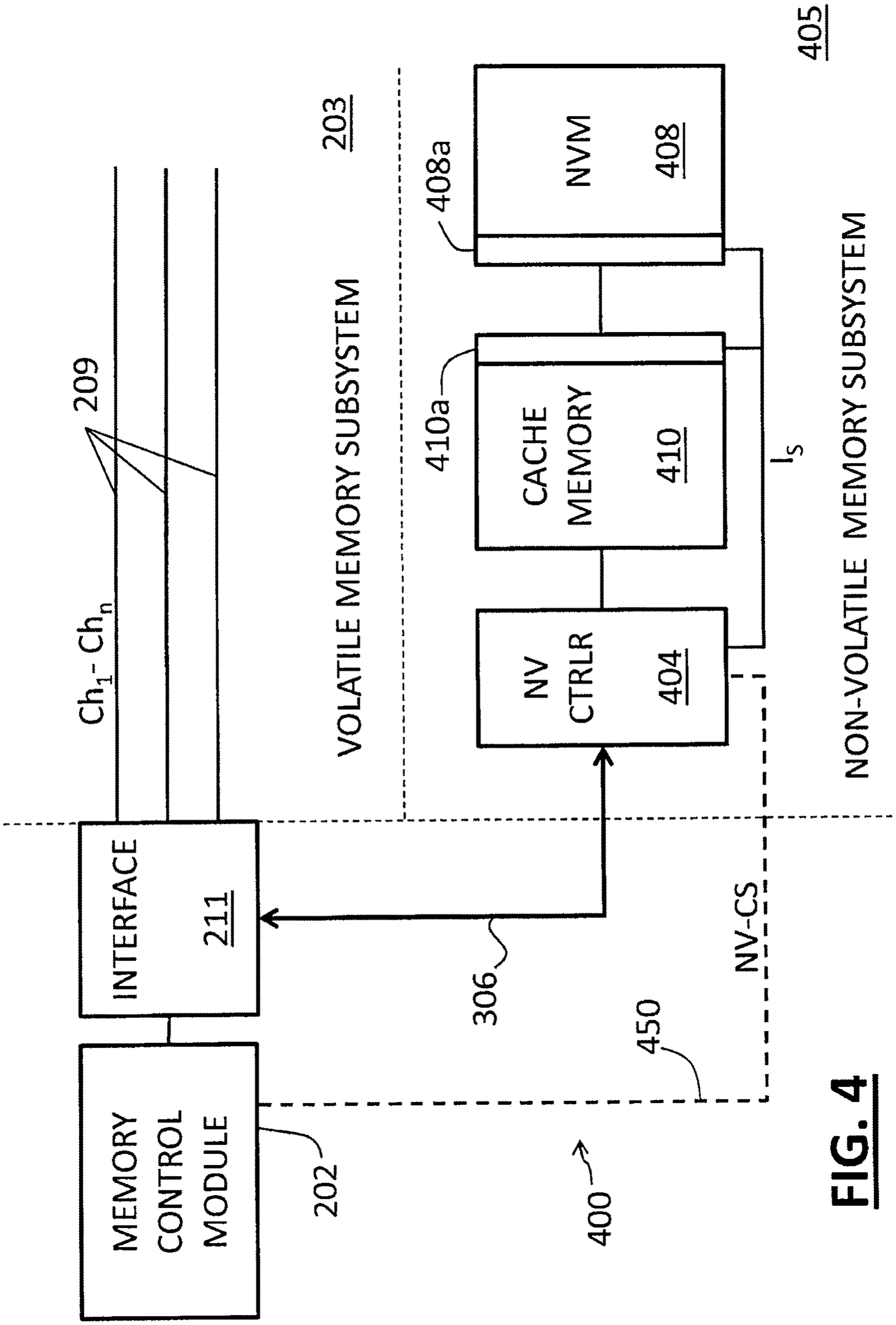
FIG. 4 is a block diagram of a memory system in which the memory control module is coupled to the volatile memory subsystem in a multi-channel arrangement, and in which an NV chip select signal line NV-CS is used to communicate an NV chip select signal between the memory control module and an NV controller.

FIG. 4 illustrates a memory system 400 in which the memory control module 202 is coupled to the volatile memory subsystem 203 in the multi-channel arrangement $Ch_1$-$Ch_n$ 209 via the interface 211 as shown in FIG. 2 and as described above. Also shown coupled to the memory control module 202 is NV memory subsystem 405 according to one embodiment. The NV memory subsystem 405 includes NV controller 404 coupled to one or more channels of the memory module channel $Ch_1$-$Ch_n$ 209 via the interface 211 using the common signal bus 306, as shown in FIG. 3 and described above. The NV memory subsystem 405 includes a cache memory 410 coupled to the NV controller 404 and to a nonvolatile memory NVM 408. The cache memory 410 comprises volatile memory, for example one or more DRAM devices. In certain embodiments, the NV controller 404 comprises a plurality of NV controllers each of which may be used to independently control data communication between the NVM 408 and at least one of the memory control module 202 and the volatile memory subsystem 203. The coupling between the cache memory 410 and the NVM 408 is effected by a cache memory interface 410*a* and an NV memory interface 408*a*, both of which are controlled by NV controller 404 using an interface signal bus Is. The NV controller 404 can communicate one or more of data, status, test, errors, system operation, health and diagnostics information, and control information with at least one of the cache memory 410 and NVM 408.

In certain embodiments, the NVM 408 comprises one or more of non-volatile memory array, at least one non-volatile memory element or die, at least one packaged non-volatile memory device, at least one module comprising non-volatile memory, a FLASH memory device, or a memory module including one or more flash memory devices. Types of non-volatile memory compatible with NVM 408 include, but are not limited to, flash memory elements such as multi-level cell (MLC), NOR, ONE-NAND, and NAND flash memory.

In one embodiment, the common signal bus 306 is external to the NV memory subsystem 405 and is used to communicate data, address, and/or control signals between the NV controller 404 and a memory module coupled to any memory module channel of the memory module channel $Ch_1$-$Ch_n$ 209. In one embodiment, the coupling between the memory control module 202, the volatile memory subsystem 203, and the NV memory subsystem 405 is effected by way of the interface 211 for delivery of data, address and/or control signals via a respective memory channel of the memory module channel $Ch_1$-$Ch_n$ 209, or via the common signal bus 306.

In one embodiment, the common signal bus 306 comprises separate signal bus $306_1$-$306_n$ (not shown) and each signal bus of the signal bus $306_1$-$306_n$ is operable to deliver data, address, and control signals between a respective channel of the memory module channel $Ch_1$-$Ch_n$ 209 and the NV controller 404, in a similar manner as shown in FIG. 2 and as described above. The NV controller 404 is operable to receive and separately control each signal bus of the signal bus $306_1$-$306_n$. The NV controller 404 in turn controls the transfer or storage of data directly from/to the NVM 408 or using the cache memory 410. In one embodiment, each of the signal bus $306_1$-$306_n$ is individually-addressable by the memory control module 202 or the NV controller 404, and is independently used to communicate data, address and control signals between the NV controller 404 and at least one of the memory control module 202 and one or more memory modules (DIMMs) (not shown) of the volatile memory subsystem 203.

In certain embodiments, the interface 211 is operable (i) to communicate one or more of data signals, address signals and control signals with the memory control module 202, (ii) to generate, process, or format one or more of data signals, address signals and control signals based at least in part on received data signals, address signals or control signals from the memory control module 202, the volatile memory subsystem 203, or the NV subsystem 405, and (iii) to selectively transmit one or more of data signals, address signals, and control signals to one or more of the memory control module 202, the volatile memory subsystem 203, and the NV subsystem 405 using one or more of at least a channel of the memory module channel $Ch_1$-$Ch_n$ 209, the common signal bus 306, a signal bus of the signal bus $306_1$-$306_n$, and a cache memory 410. In certain embodiments, the interface 211 is integrated with the memory control module 202, a CPU, or a memory controller to form a single component, an integrated circuit, or a memory system.

In certain embodiments, the interface 211 snoops at least one of data signals, address signals, and control signals from one or more channel of the memory module channel $Ch_1$-$Ch_n$ 209, and transmits the at least one of data signals, address signals, and control signals to the NV controller 404. In certain embodiment, the interface 211 generates at least one of data signals, address signals, and control signals in response to at least one of data signals, address signals, and control signals received from any one of the memory control module 202, the volatile memory subsystem 203, or the NV memory subsystem 405. The interface 211 transmits the generated at least one of data signals, address signals, and control signals to the NV controller 504 via the common signal bus 306.

In certain embodiments, the interface 211 snoops a first set of data, address, and control signals from one or more channel of the memory module channel $Ch_1$-$Ch_n$ 209, and transmits a second set of data, address, and control signals via the common signal bus 306 to the NV controller 504. The second set of data, address, and control signals is generated based on the first set of data, address, and control signals. In one embodiment, the second set of data, address, and control signals correspond to a copy of the first set of data, address, and control signals. In one embodiment, one or more of data signals, address signals, and control signals of the first set of data, address, and control signals are processed by interface 211 before being transmitted as part of the second set of data, address, and control signals. For example, the interface 211 includes a serializer and a deserializer (or SERDES) in order to receive, process, format, and transmit data signals, address signals, or control signals using a serial interface or a parallel interface. In certain embodiments, the memory module channel $Ch_1$-$Ch_n$ 209 include a parallel interface, while the common signal bus 306 includes at least one serial interface or at least one parallel interface. In certain embodiments, each signal bus of the signal bus $306_1$-$306_n$ includes at least one SERDES that is used to couple the interface 211 to the NV controller 404. In certain embodiments, the interface 211 is operable to process, replicate, regenerate, modify, delay, format, compress, error check, or generate one or more of data signals, address signals, and control signals of the second set of data, address, and control signals based on one or more of data signals, address signals, and control signals of the first set of data, address, and control signals. In certain embodiments, the interface 211 manages and control communication of data, address, and/or control signals from/to the NV memory subsystem 405 to/from at least one of the memory control module 202 and one or more memory modules that are coupled to one or more channels of the memory module channel $Ch_1$-$Ch_n$ 209.

In certain embodiments, at least one NV chip select signal line NV-CS 450 (only one, $CS_1$, is shown using a dashed line) is used to communicate at least one NV chip select signal between memory control module 202 and the at least one NV controller 404. The at least one NV chip select signal line NV-CS 450 may be similar to chip select signal lines communicating chip select signals from the memory control module 202 along each channel of the memory module channel $Ch_1$-$Ch_n$ 209 for selection of associated volatile memories of memory modules (DIMMs) coupled to the memory module channel $Ch_1$-$Ch_n$ 209. The memory control module 202 uses the chip select signal lines to manage read/write operations from/to each of the volatile memory modules in the channels $Ch_1$-$Ch_n$ 209. In a similar manner, in one embodiment, the at least one NV chip select signal line NV-CS 450 may be used to couple a chip select signal to the NV controller 404, so that the chip select signal can be used by the memory control module 202 to manage read or write operations from/to the at least one NV memory 408 during, for example, backup and restore operations, as well as read or write operations from/to the volatile memory subsystem 203 via the one or more channels $Ch_1$-$Ch_n$ 209. The at least one NV chip select signal line NV-CS 450 may additionally or alternatively be used to couple other control or command signals from the memory control module 202 to the NV controller 404. Thus, other control or command signals can be used by the memory control module 202 to manage read or write operation from/to the at least one NV memory 408 in conjunction with read or write operations from/to the volatile memory subsystem 203 via the one or more channels $Ch_1$-$Ch_n$ 209.

In certain embodiments, the NV controller 404 is coupled directly to the memory control module 202 via at least one chip select line (NV-CS 450 shown as dashed lines). In certain embodiments, the NV controller 404 is coupled directly to interface 211 via at least one chip select line (not shown). In certain embodiments, the NV controller 404 receives at least one NV chip select signal NV-CS directly from the memory control module 202. In certain embodiments, the NV controller 404 receives the at least one NV chip select signal NV-CS directly from the interface 211. In certain embodiments, the interface 211 generates and transmits at least one NV chip select signal NV-CS to the NV controller 404. In certain embodiments, the interface 211 generates the at least one NV chip select signal NV-CS in response to data, address, or control signals from the memory control module 202 or the volatile memory system 203. In certain embodiments, the NV controller 404 receives at least one NV chip select signal NV-CS from the memory control module 202 via the interface 211 using the common signal bus 306 or via each of the signal bus $306_1$-$306_n$.

Figure 5:
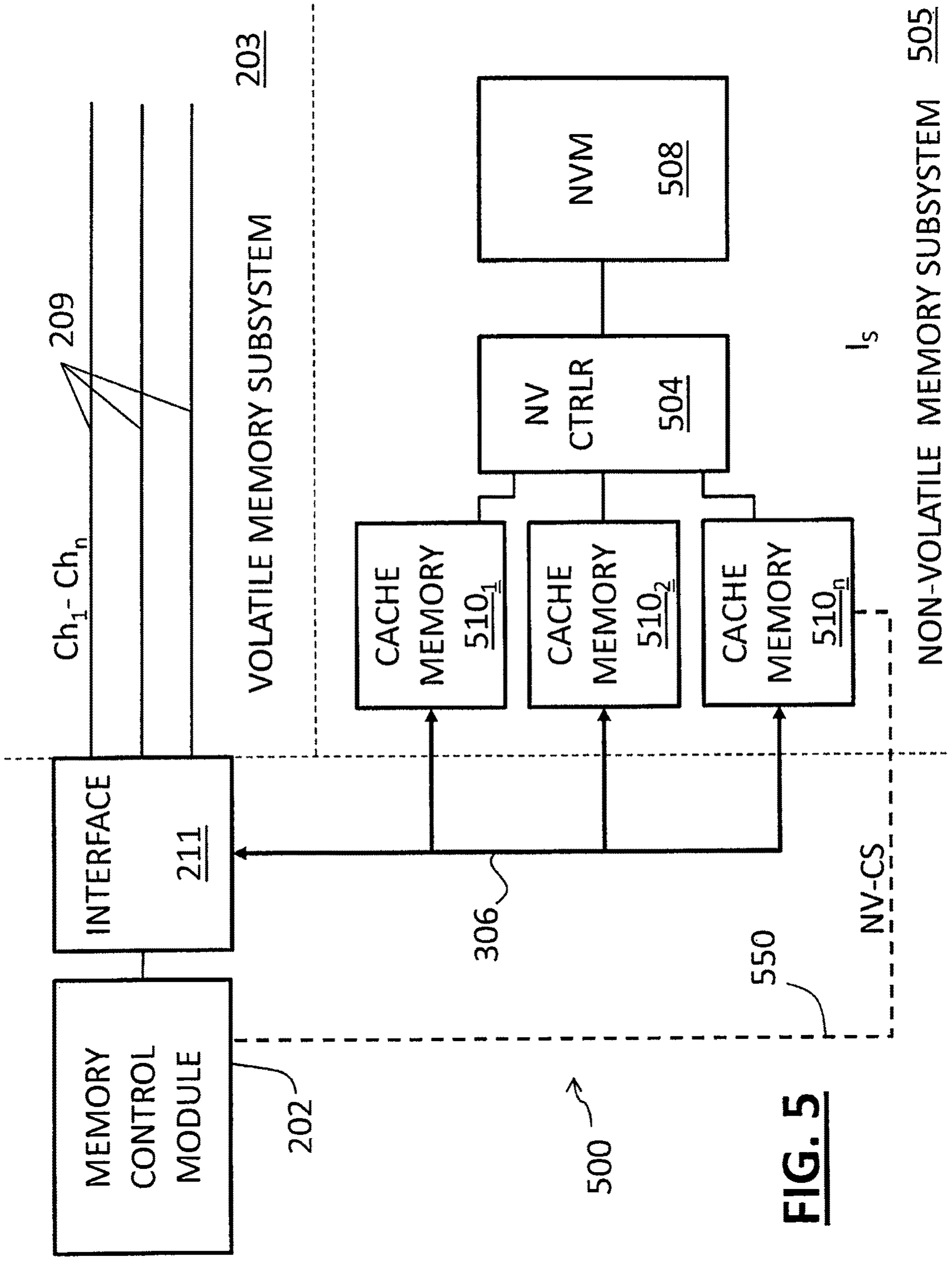
FIG. 5 is a block diagram of a memory system in which the memory control module is coupled to the volatile memory subsystem in a multi-channel arrangement and in which the NV memory subsystem includes an NV controller coupled to one or more channels of the memory module using one or more cache memories.

FIG. 5 illustrates a memory system 500 in which the memory control module 202 is coupled to the volatile memory subsystem 203 in the multi-channel arrangement $Ch_1$-$Ch_n$ 209 via the interface 211 as shown in FIG. 2 and as described above. Also shown coupled to the memory control module 202 is NV memory subsystem 505 according to one embodiment. The NV memory subsystem 505 includes NV controller 504 coupled to one or more channels of the memory module channel $Ch_1$-$Ch_n$ 209 using one or more cache memory $510_1$-$510_n$, (collectively cache memory 510), and the interface 211. The NV controller 504 is coupled to a nonvolatile memory NVM 508. The cache memory 510 comprises volatile memory, for example one or more DRAM devices. The cache memory 510 is coupled to the interface 211 using a common signal bus 306. In one embodiment, the one or more cache memories 510 are used to buffer and manage data transfer between the NV controller 504 and one or more memory module coupled to one or more channel of memory module channels $Ch_1$-$Ch_n$ 209. In one embodiment the NV controller 504 manages data backup and restore operations (e.g. write or read operations) to or from the NVM 508 and the volatile memory subsystem 203.

In one embodiment, the common signal bus 306 is external to the NV memory subsystem 505 and is used to communicate data, address, and/or control signals between the NV controller 504—via the cache memory 510 or bypassing the cache memory 510—and a memory module coupled to any memory module channel of the memory module channel $Ch_1$-$Ch_n$ 209. In one embodiment, the coupling between the memory control module 202, the volatile memory subsystem 203, and the NV memory subsystem 305 is effected by way of the interface 211 for delivery of data, address and/or control signals via a respective memory channel of the memory module channel $Ch_1$-$Ch_n$ 209, or via the common signal bus 306.

In one embodiment, the common signal bus 306 comprises separate signal bus $306_1$-$306_n$ (not shown) and each signal bus of the signal bus $306_1$-$306_n$ is operable to deliver data, address, and control signals between a respective channel of the memory module channel $Ch_1$-$Ch_n$ 209 and a respective cache memory $510_1$-$510_n$. Various embodiments described above for the use of common signal bus 306 in FIG. 3 and FIG. 4 are applicable to embodiments and use as shown in FIG. 5. The NV controller 504 is operable to separately control each signal bus of the signal bus $306_1$-$306_n$ for data communication with the volatile memory subsystem 203 and the memory control module 202. The NV controller 504 is operable to manage and control the transfer or storage of data from/to the NVM 308. In one embodiment, each of the signal bus $306_1$-$306_n$ is individually-addressable by the memory control module 202 or the NV controller 504, and is independently used to communicate data, address and control signals between the NV controller 504 and at least one of the memory control module 202 and one or more memory modules (DIMMs) (not shown) of the volatile memory subsystem 203.

In certain embodiments, the NV controller 504 comprises a plurality of NV controllers each of which may be used to independently control data communication between the NVM 508 and at least one of the memory control module 202 and the volatile memory subsystem 203. In one embodiment, the cache memory 510 includes a cache memory interface controlled by the NV controller 510 in order to manage data communication and signal interface with the NV controller 504 or the interface 211. The NV controller 504 can communicate one or more of data, status, test, errors, system operation, health and diagnostics information, and control information with at least one of the cache memory 510 and NVM 508.

In certain embodiments, the NVM 508 comprises one or more of non-volatile memory array, at least one non-volatile memory element or die, at least one packaged non-volatile memory device, at least one module comprising non-volatile memory, a FLASH memory device, or a memory module including one or more flash memory devices. Types of non-volatile memory compatible with NVM 308 include, but are not limited to, flash memory elements such as multi-level cell (MLC), NOR, ONE-NAND, and NAND flash memory.

In certain embodiments, the interface 211 is operable (i) to communicates one or more of data signals, address signals and control signals with the memory control module 202, (ii)

to generate, process, or format one or more of data signals, address signals and control signals based at least in part on received data signals, address signals or control signals from the memory control module 202, the volatile memory subsystem 203, or the NV subsystem 505, and (iii) to selectively transmit one or more of data signals, address signals, and control signals to one or more of the memory control module 202, the volatile memory subsystem 203, and the NV subsystem 505 using one or more of at least a channel of the memory module channel $Ch_1$-$Ch_n$ 209, the common signal bus 306, a signal bus of the signal bus 306$_1$-306$_n$, and a cache memory of the cache memory 510$_1$-510$_n$. In certain embodiments, the interface 211 is integrated with the memory control module 202, a CPU, or a memory controller to form a single component, an integrated circuit, or a memory system.

In certain embodiments, the interface 211 snoops at least one of data signals, address signals, and control signals from one or more channel of the memory module channel $Ch_1$-$Ch_n$ 209, and transmits the at least one of data signals, address signals, and control signals to the NV controller 504 using at least one cache memory of the cache memory 510$_1$-510$_n$. In certain embodiment, the interface 211 generates at least one of data signals, address signals, and control signals in response to at least one of data signals, address signals, and control signals received from any one of the memory control module 202, the volatile memory subsystem 203, the cache memory 510, or the NV subsystem 505. The interface 211 transmits the generated at least one of data signals, address signals, and control signals to the NV controller 504 via the common signal bus 306.

In certain embodiments, the interface 211 snoops a first set of data, address, and control signals from one or more channel of the memory module channel $Ch_1$-$Ch_n$ 209, and transmits a second set of data, address, and control signals via the common signal bus 306 to the cache memory 510 or the NV controller 504. The second set of data, address, and control signals is generated based on the first set of data, address, and control signals. In one embodiment, the second set of data, address, and control signals correspond to a copy of the first set of data, address, and control signals. In one embodiment, one or more of data signals, address signals, and control signals of the first set of data, address, and control signals are processed by interface 211 before being transmitted as part of the second set of data, address, and control signals. For example, the interface 211 includes a serializer and a deserializer (or SERDES) in order to receive, process, format, and transmit data signals, address signals, or control signals using a serial interface or a parallel interface. In certain embodiments, the memory module channel $Ch_1$-$Ch_n$ 209 include a parallel interface, while the common signal bus 306 includes at least one serial interface or at least one parallel interface. In certain embodiments, each signal bus of the signal bus 306$_1$-306$_n$ includes at least one SERDES that is used to couple the interface 211 to each of the cache memory 510$_1$ 510$_n$. In certain embodiments, the interface 211 is operable to process, replicate, regenerate, modify, delay, format, compress, error check, or generate one or more of data signals, address signals, and control signals of the second set of data, address, and control signals based on one or more of data signals, address signals, and control signals of the first set of data, address, and control signals. In certain embodiments, the interface 211 manages and control communication of data, address, and/or control signals from/to the NV memory subsystem 505 to/from at least one of the memory control module 202 and one or more memory modules that are coupled to one or more channels of the memory module channel $Ch_1$-$Ch_n$ 209.

In certain embodiments, at least one NV chip select signal line NV-CS 550 (only one, $CS_1$, is shown using a dashed line) is used to communicate at least one NV chip select signal between memory control module 202 and the at least one NV controller 504. The at least one NV chip select signal line NV-CS 550 may be similar to chip select signal lines communicating chip select signals from the memory control module 202 along each channel of the memory module channel $Ch_1$-$Ch_n$ 209 for selection of associated volatile memories of memory modules (DIMMs) coupled to the memory module channel $Ch_1$-$Ch_n$ 209. The memory control module 202 uses the chip select signal lines to manage read/write operations from/to each of the volatile memory modules in the channels $Ch_1$-$Ch_n$ 209. In a similar manner, in one embodiment, the at least one NV chip select signal line NV-CS 550 may be used to couple a chip select signal to the NV controller 504, so that the chip select signal can be used by the memory control module 202 to manage read or write operations from/to the at least one NV memory 508 during, for example, backup and restore operations, as well as read or write operations from/to the volatile memory subsystem 203 via the one or more channels $Ch_1$-$Ch_n$ 209. The at least one NV chip select signal line NV-CS 550 may additionally or alternatively be used to couple other control or command signals from the memory control module 202 to the NV controller 504. Thus, other control or command signals can be used by the memory control module 202 to manage read or write operation from/to the at least one NV memory 508 during, for example, backup and restore operations, in conjunction with read or write operations from/to the volatile memory subsystem 203 via the one or more channels $Ch_1$-$Ch_n$ 209.

In certain embodiments, the NV controller 504 is coupled directly to the memory control module 202 via at least one chip select line (NV-CS 550 and NV-CS 550-1 shown as dashed lines). In certain embodiments, the NV controller 504 is coupled directly to interface 211 via at least one chip select line (NV-CS 550 and NV-CS 550-2 shown as dashed lines). In certain embodiments, the NV controller 504 receives at least one NV chip select signal NV-CS directly from the memory control module 202. In certain embodiments, the NV controller 504 receives the at least one NV chip select signal NV-CS directly from the interface 211. In certain embodiments, the interface 211 generates and transmits at least one NV chip select signal NV-CS to the NV controller 504. In certain embodiments, the interface 211 generates the at least one NV chip select signal NV-CS in response to data, address, or control signals from the memory control module 202 or the volatile memory system 203. In certain embodiments, the NV controller 504 receives the at least one NV chip select signal NV-CS from the memory control module 202 via the interface 211 using the common signal bus 306 or via each of the signal bus 306$_1$-306$_n$.

In certain embodiments, the memory controller 102-202 corresponds to a processor in a host computer system, a memory controller or a controller in other memory subsystems that can be used with the NV subsystem. In certain embodiments, the at least one NV controller 104-504 and the at least one non-volatile memory module 108-508 are mounted on the motherboard (not shown) or are coupled to the motherboard via an electrical interface. The electrical interface (not shown) can include at least one of an electrical connector, logic device, integrated circuit, programmable logic device, register, switch, and load reducing circuit. The electrical interface may include industry standard based components or custom designed components. The electrical interface can be integrated with the at least one NV controller 104-504 and/or with the at least one non-volatile memory NVM 108-508 to provide enhanced performance and lower cost.

Persons of ordinary skill in the art should recognize that the above examples of various arrangements of different components in the NV subsystem 105-505 are not exhaustive. Other variations are also possible to allow the NV subsystem to perform some or all of the operations described herein.

The NV subsystem 105-505 according to certain embodiments is usable with one or more DIMM channels that comprise standard DIMMs (e.g., RDIMM, HCDIMM, or LRDIMM) or proprietary DIMMs or other memory modules. The NV subsystem according to certain embodiments allows flexible sizing of the density of the non-volatile memory with respect to overall memory system requirements, as it is independent of the density of any of the one or more DIMMs or the overall density of the volatile memory subsystem 103-203. Read, write, backup and restore operations can be made from any of the one or more DIMMs to the non-volatile memory 108-508, or from the non-volatile memory to any of the one or more DIMMs, or between the memory control module 102-202 and the non-volatile memory 108-508. The NV subsystem 105-505 according to certain embodiments has complete control of a backup—and—restore memory space. Further, since the NV controller 104-504 and the non-volatile memory 108-508 are external to the DIMMs, there is no need for a dedicated back-up power (e.g., battery or special capacitor mounted on a DIMM) for the NV subsystem, as any battery or other type of regular or backup power source that may be powering the motherboard can support the operation of the NV subsystem according to certain embodiments.

In addition to backing up data during triggered events (e.g. actual or predicted power loss, or backup request), the NV subsystem 105-505 of certain embodiments can also operate independently to manage backup of data during normal system operation without support from memory controller 102-202. Such independent operation may be programmed into the NV subsystem upon initialization or in accordance with certain user defined parameters.

In the power loss data backup operation, the NV subsystem 105-505 according to certain embodiments pre-configures the NV controller 104-504 to copy data from specific main memory locations of volatile memory subsystem 103-203 to the non-volatile memory 108-508. The data in the main memory is not deleted as long as auxiliary power or back-up power (e.g. a battery or capacitor) is still available.

The NV controller 104-504 according to certain embodiments can be programmed to interrupt the backup operation if power is restored prior to completion of the backup process. In this case, the NV controller according to certain embodiments may not attempt to restore the data back to the main memory from the non-volatile memory since the data in the main memory should not have been lost.

When a power loss duration is long enough for the NV controller 104-504 to complete the data copy from the main memory to non-volatile memory, the NV controller according to certain embodiments restores the data back to the main memory from non-volatile memory as the system power is restored.

In the data backup during normal operation mode, the system described herein can pre-program the NV controller 104-504 with specific main memory addresses (or multiple ranges of address spaces). The NV controller can continuously monitor (write) data transactions by snooping main memory access activities, and if any write address is within the pre-programmed address spaces, the NV controller can write the snooped data into the non-volatile memory 108-508. This operation does not require any memory control module involvement as the NV controller automatically updates the non-volatile memory 108-508 as the data is updated in the preprogrammed main memory addresses. However, since this operation may require frequent write operation to non-volatile memory, it may cause accelerated NVM aging even with wear-leveling. Therefore, one or more caches, such as memory caches 410-710 shown respectively in FIGS. 4-5, can be used to collect the updates prior to updating the non-volatile memory. In certain embodiments, the interface 211 may be used to monitor main memory access activities, and if any write address is within the pre-programmed address spaces, the interface 211 communicates data, address, and control signals corresponding to the main memory access activities to the NV controller 104-504, wherein the NV controller 104-504 is operable to manage and control writing the snooped data into the non-volatile memory 108-508. In certain embodiments, the interface 211 alerts the NV controller 104-504 using a least one chip select signal prior to communicating the snooped data to the NV controller 104-504.

In the embodiments shown in FIGS. 4-5, the NV memory subsystem 405-505 can operate in an operation mode in which the memory caches 410-510 can be used to support fast capture of snooped data, to increase access performance of the non-volatile memory 408-508, and to minimize non-volatile memory write accesses so as to prolong the life of non-volatile memory 408-508.

In FIG. 4, the memory caches 410 are located between the NV controller and the non-volatile memory, allowing the NV subsystem to have a unified cache to support all main volatile memory channels $Ch_1$-$Ch_n$ 209. While flow rate control may be more complicated due to the fact that there is a single data path from four main memory channels to one cache memory 410, placing the at least one cache between the NV controller 404 and the non-volatile memory 408 provides easier cache and non-volatile memory interface control. This arrangement also provides the flexibility of assigning different amounts of memory cache space for each memory channel, and the amount can be dynamically configured by the system or via programmable registers.

FIG. 5 shows at least one memory cache 510 per main memory channel, such that each memory channel $Ch_1$-$Ch_n$ 209 is supported by at least one individual cache. Compared to the arrangements in FIG. 4, the arrangements in FIG. 5 allow simpler control between the main memory channels $Ch_1$-$Ch_n$ 209 and the memory caches 510, and from the memory caches to the NV memory 508. The cache size per main memory channel, however, may have to be predefined.

The configurations in FIGS. 4 and 5, where at least one NV-CS signal is coupled to the NV controller 404 and 405, allow the memory system to have dynamic control on when data should be saved into the non-volatile memory 408, and 508. As shown in FIGS. 4 and 5, the memory control module 202 can activate the NV-CS (NV chip select) signal whenever it decides to store a particular data transaction. The NV controller 404, 504, as it receives the NV-CS signal via the NV-CS signal line, can capture the data and address, and manage the operation of storing data in the associated address of the NV memory 408, 508. Furthermore, the NV controller or the interface can be programmed to monitor main memory control signals of each of the channels (e.g.

the NV-CS signal line(s) or any other single control signal or a group of control signals forming a memory command) and automatically initiate backup data operation. Moreover, in the NV systems shown in FIGS. 4 and 5, the NV controller can be preconfigured to automatically backup data that is written with specific memory addresses, while the memory control module can activate the NV controller via the NV-CS signal(s) to implement dynamic backup.

In certain embodiments, backup operations are triggered by one or more trigger conditions. Examples of the trigger conditions include power interruption, power failure, power reduction, system hang-up, a request by the host computer system, the host computer system voltage dropping below a certain threshold voltage, the host computer system voltage rising above a certain threshold voltage, the host computer system voltage being below a first threshold voltage and above a second threshold voltage, and a reboot condition.

Thus, a system according to certain embodiments herein is capable of providing configurable system level data persistence and can be used in many storage applications including, but not limited to, indexing for SSD (solid state device) or HDD (hard disk device), fast access of Hot data, preservation of transient data in network servers, preservation of not fully-committed transactions in transaction servers, persistent RAM Disks, preservation of state and interim results for backup and resume in computer servers.

For example, in the applications of indexing for SSD or HDD, the system according to certain embodiments allows NV storage of indexes of SSD or HDD data or content for fast data moves.

In the application of preservation of transient data in network servers, the system according to certain embodiments allows a memory system to configure the NV controller with main memory spaces (address ranges) that need to be stored into non-volatile for backup & restore operation (or for power loss protection) so as to preserve state and interim results for backup, restore, and resume In the application of persistent RAM Disks, the NV system according to certain embodiments allows a memory system to program the NV controller to snoop data write operations from the main memory channels without intervention by memory control module 202. The NV controller can automatically make mirror images of certain address spaces of the main memory in nonvolatile memory while the main memory modules (e.g. DIMMs) perform write operations as issued by the memory control module 202.

The system according to certain embodiments offers various advantages over conventional DIMM with NV backup. For example, while a conventional DIMM with NV backup would have increased physical size and/or reduced DIMM volatile memory density to make space for an on-DIMM NV backup subsystem, the NV backup subsystem according to certain embodiments would provide backup for a memory system that has its DIMM sockets populated by high density standard DIMMs (RDIMM, HCDIMM, or LRDIMM). In addition, by having the NV backup subsystem mounted independently from the actual DIMMs in the presently-disclosed manner, the NV backup subsystem according to certain embodiments provides additional flexibility to control and manage the size or density of the non-volatile memory required for optimal cost and performance of the host computer system—irrespective of the number of independent memory channels (e.g. $Ch_1$-$Ch_n$ 209), the number of DIMMs per memory channel, and the actual density of each DIMM being used.

Furthermore, the NV backup subsystem according to certain embodiments provides the capability to control and manage backup from any one of the DIMMs, regardless which memory channel is being used, to the non-volatile memory, resulting in additional cost and/or performance advantages. This also provides maximum flexibility for the system to control the backup and restore memory space either directly or by offloading the backup and restore operations to an intelligent programmable NV backup subsystem. The host computer system can program the NV backup subsystem to automatically initiate backup or restore based on programmable user preferences or parameters. Furthermore, because the NV backup subsystem is not mounted on the DIMMs and can be integrated onto a motherboard of a host computer system, the motherboard's dedicated backup power source, e.g. battery or large capacitors, can be used to support the NV backup subsystem operations. Therefore, a host computer system level NV backup subsystem implementation provides whole system persistence with much less cost and more flexibility to configure, manage, and control the read and write operations from/to the non-volatile memory subsystem, e.g. backup and restore operations.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A memory system configured to communicate with a host memory controller, comprising:
- a volatile memory (VM) subsystem including at least two VM modules respectively coupled to a first VM channel and a second VM channel;
- a non-volatile memory (NVM) subsystem including a NVM controller and one or more NVM elements; and
- an interface couplable to the host memory controller and coupled to both the VM subsystem and the NVM subsystem, the interface including
  - a memory controller and
  - a switch,
  - wherein the interface is
    - coupled to the NVM system via a common signal bus, and
    - configured to access
      - two or more independent memory channels that include the first VM channel and the second VM channel,
      - the first VM channel via a first set of data, address and control signal lines, and
      - the second VM channel via a second set of data, address and control signal lines,
- wherein the interface is operable to:
  - receive from any one of the host memory controller, the VM subsystem, or the NVM subsystem a first set of signals selected from data, address signals, and control signals;
  - monitor the first VM channel and the second VM channel to detect one or more memory access operations from the host memory controller to at least one memory address of the first VM module or the second VM module;
  - generate, in correspondence with the first set of signals, a second set of signals selected from data, address signals, and control signals; and
  - transmit the second set of signals to the NVM controller of the NVM subsystem.

2. The memory system of claim 1, further including a common signal bus by which the interface transmits the second set of signals to the NVM controller.

3. The memory system of claim 2, wherein the common signal bus includes a plurality of separate signal buses each corresponding to a volatile memory channel of the first and second volatile memory channels.

4. The memory system of claim 3, wherein each of the separate signal buses is individually addressable by the host memory controller or by the NVM controller.

5. The memory system of claim 2, wherein the common signal bus is external to the NVM subsystem.

6. The memory system of claim 1, wherein the second set of signals is a copy of the first set signals.

7. The memory system of claim 1, wherein the memory controller or the switch of the interface includes a serializer and a deserializer operable to receive, process, format, and transmit data signals, address signals, or control signals using a serial interface or a parallel interface.

8. The memory system of claim 1, wherein the memory controller or the switch of the interface is operable to process, replicate, regenerate, modify, delay, format, compress, error check, or generate one or more of data signals, address signals, and control signals of the second set of signals based on one or more of data signals, address signals, and control signals of the first set of signals.

9. The memory system of claim 1, wherein the memory controller or the switch of the interface is operable manage communication of data, address, and/or control signals from/to the NVM subsystem to/from at least one of the host memory controller and one or more volatile memory modules that are coupled to one or more first and second volatile memory channels.

10. The memory system of claim 1, further comprising at least one NV chip select signal line coupled to an NV controller for selection of the NV controller by the host memory controller.

11. The memory system of claim 10, wherein the NV chip select signal line is coupled to the NV controller by way of the interface.

12. A memory system for connection to a host system, the memory system comprising:

- a volatile memory (VM) subsystem including
  - one or more VM modules, and
  - a VM channel associated with each VM module, each VM channel including a set of data lines through which data is deliverable to and from the associated VM module, and a set of address and control lines through which address and control signals are deliverable to and from the associated VM module;
- a non-volatile memory (NVM) subsystem including
  - at least one NVM controller, and
  - at least one NVM module associated with the at least one NVM controller; and
- an interface couplable to the host system and coupled to both the VM subsystem and the NVM subsystem, the interface including a memory controller and a switch, wherein the interface is coupled to the NVM system via a common signal bus,
- wherein the at least one NVM controller is operable to monitor a VM channel of the VM subsystem via the interface to detect a memory access operation by the host system, and to capture a copy of data associated with the detected memory access operation.

13. The memory system of claim 12, wherein the at least one NVM controller is operable to store the captured copy of data in the at least one NVM module.

14. The memory system of claim 12, wherein

- the NVM subsystem further includes a cache, and
- the at least one NVM controller is operable to store the captured copy of data in the cache.

15. The memory system of claim 14, wherein the cache comprises volatile memory.

16. The memory system of claim 12, wherein the memory access operation comprises a data write operation performed by a memory controller of the host system to at least one of the one or more VM modules.

17. The memory system of claim 12, wherein capturing a copy of data associated with the detected memory access operation is performed in response to a trigger signal.

18. The memory system of claim 17, wherein the trigger signal is responsive to one or more of a power interruption, a power failure, a power reduction, a system hang-up, a request by the host system, a host system voltage dropping below a threshold voltage, a host system voltage exceeding a threshold voltage, the host system voltage being below a first threshold voltage and above a second threshold voltage, and a reboot condition.

19. A method for monitoring memory access operations in a computer system having a memory controller, the method comprising:

- coupling the memory controller of the computer system to an interface via a set of data lines and a set of address and control signal lines, wherein the interface includes a memory controller and a switch;
- coupling the interface to a first memory channel via a first set of data lines and a first set of address and control signal lines, wherein a first VM subsystem is coupled to the interface via the first memory channel, the first VM subsystem communicates data with the memory controller of the computer system via the interface using the first set of data lines;
- coupling the interface to a second memory channel via a second set of data lines and a second set of address and control signal lines, wherein a second VM subsystem is coupled to the interface via the second memory channel, the second VM subsystem communicates data with the memory controller of the computer system via the interface using the second set of data lines;
- coupling the interface to a nonvolatile memory (NVM) subsystem, the NVM subsystem including a nonvolatile (NV) controller and at least one NVM element;
- monitoring each of the first and second memory channels to detect one or more memory access operations from the memory controller of the computer system to at least one predetermined address range of the first or second VM subsystems; and
- capturing a copy of data associated with the one or more memory access operations.

20. The method of claim 19, further comprising:

- storing the captured copy of data associated with the one or more memory access operations in the at least one NVM element.

21. The method of claim 19, wherein the one or more memory access operations include one or more data write operations performed by the memory controller of the computer system to one or more of the first or second VM subsystems.

22. The method of claim 19, wherein

- the first memory channel includes a first VM module comprising the first VM subsystem,
- the second memory channel includes a second VM module comprising the second VM subsystem, and the one or more memory access operations include one or more memory access operations performed by the memory controller to one or more of the first or second memory modules.

23. The method of claim 19, wherein the capturing a copy of data associated with the one or more memory access operations further comprising generating a trigger signal, and capturing a copy of data associated with the one or more memory access operations in response to the trigger signal.

* * * * *